United States Patent [19]
Zbinden

[11] 3,768,358
[45] Oct. 30, 1973

[54] COLD CIRCULAR SAW

[76] Inventor: Rudolf Zbinden, Zelgweg 4, Bremgarten, Switzerland

[22] Filed: Jan. 10, 1972

[21] Appl. No.: 216,390

[30] Foreign Application Priority Data
Jan. 13, 1971 Switzerland.......................... 505/71

[52] U.S. Cl................. 83/466.1, 83/473, 83/477.2, 83/488, 83/594
[51] Int. Cl....................... B23d 45/14, B23d 47/02
[58] Field of Search................ 83/594, 466.1, 471.3, 83/477.2, 486.1, 488, 453, 454, 473, 486, 471.2

[56] References Cited
UNITED STATES PATENTS

| | | | |
|---|---|---|---|
| 2,719,547 | 10/1955 | Gjerde | 83/471.3 |
| 1,126,212 | 1/1915 | Hendee | 83/488 X |
| 1,028,103 | 6/1912 | Fergusson | 83/488 X |
| 3,625,102 | 12/1971 | Shiino | 83/488 X |
| 3,386,322 | 6/1968 | Stone et al. | 83/488 |

*Primary Examiner*—Andrew R. Juhasz
*Assistant Examiner*—James F. Coan
*Attorney*—Werner W. Kleeman

[57] ABSTRACT

A cold circular saw comprising a rotary table and a circular saw blade. A drive assembly is provided for the circular saw blade, said drive assembly being connected with the rotary table by guide means and displaceable relative to the rotary table. A yoke serves to hold the workpiece to be processed, said yoke at least partially spanning the rotary table and being displaceable along two longitudinal guides. The guide means for the drive assembly embodies a single square column and components around the square column. A piston provided with a piston rod moves the drive assembly and is arranged within the square column, said square column having a cylindrical bore providing the working compartment for the piston. The square column is rigidly connected with the rotary table or with the drive assembly and the piston is rigidly connected with the drive assembly or the rotary table respectively.

6 Claims, 6 Drawing Figures

COLD CIRCULAR SAW

The present invention relates to a cold circular saw with a rotary table, a drive assembly for a circular sawblade, said assembly being connected to the rotary table via a guide and displaceable with respect to the former, and a yoke for holding the pieces to be worked, said yoke being displaceable along two longitudinal guides and spanning the rotary table at least partially.

A circular saw with a rotary table is already known where the drive assembly with the circular sawblade is displaceable with respect to the rotary table along guide-bars disposed on the rotary table. The feed motion is imparted to the drive assembly by a feed drive which is disposed next to the guide-bars. The guide-bars and the feed drive take up a relatively large amount of room, so that the known cold circular saw has a large housing in order to accommodate the drive assembly with the guide-bars and the feed drive. Since the rotary table with the drive assembly is made to be rotatable, a great deal of dead space is taken up in addition.

SUMMARY OF THE INVENTION

The task of the invention is to create a cold circular saw which takes up less space, which is simpler in its construction and hence less expensive to produce.

The cold circular saw according to the invention is characterized in that the guide for the drive assembly exhibits a square column with a cylindrical bore in which a piston with a piston-rod is disposed for imparting the feed motion to the drive assembly, and parts enclosing the square column.

BRIEF DESCRIPTION OF THE DRAWINGS

The invented matter is explained in more detail below with reference to the drawings, by way of example. Shown are FIG. 1 the front view of a cold circular saw, FIG. 2 the side view of the same cold circular saw, part of the housing being cut away in order to permit viewing of the parts inside of the housing, FIG. 3 a longitudinal section through the guide of the drive assembly, drawn on a larger scale, FIG. 4 a cross-section through the guide of the drive assembly along the line IV—IV of FIG. 2, FIG. 5 a partial radial section through the peripheral region of the rotary table, drawn on a larger scale and FIG. 6 a cross-section through one of the longitudinal guides of the yoke, drawn on a larger scale.

DETAILED DESCRIPTION OF THE PREFERRED EMBODIMENTS

Figure 1:
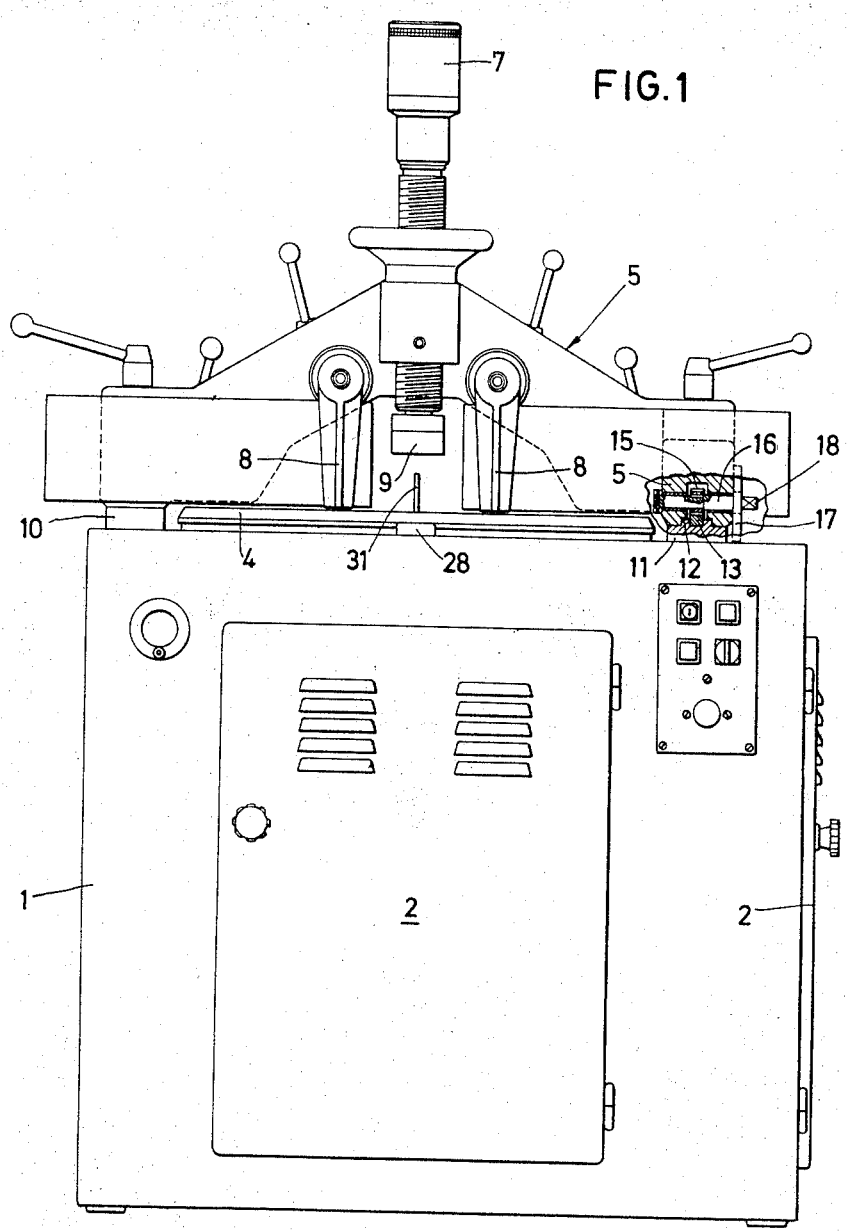
Figure 2:
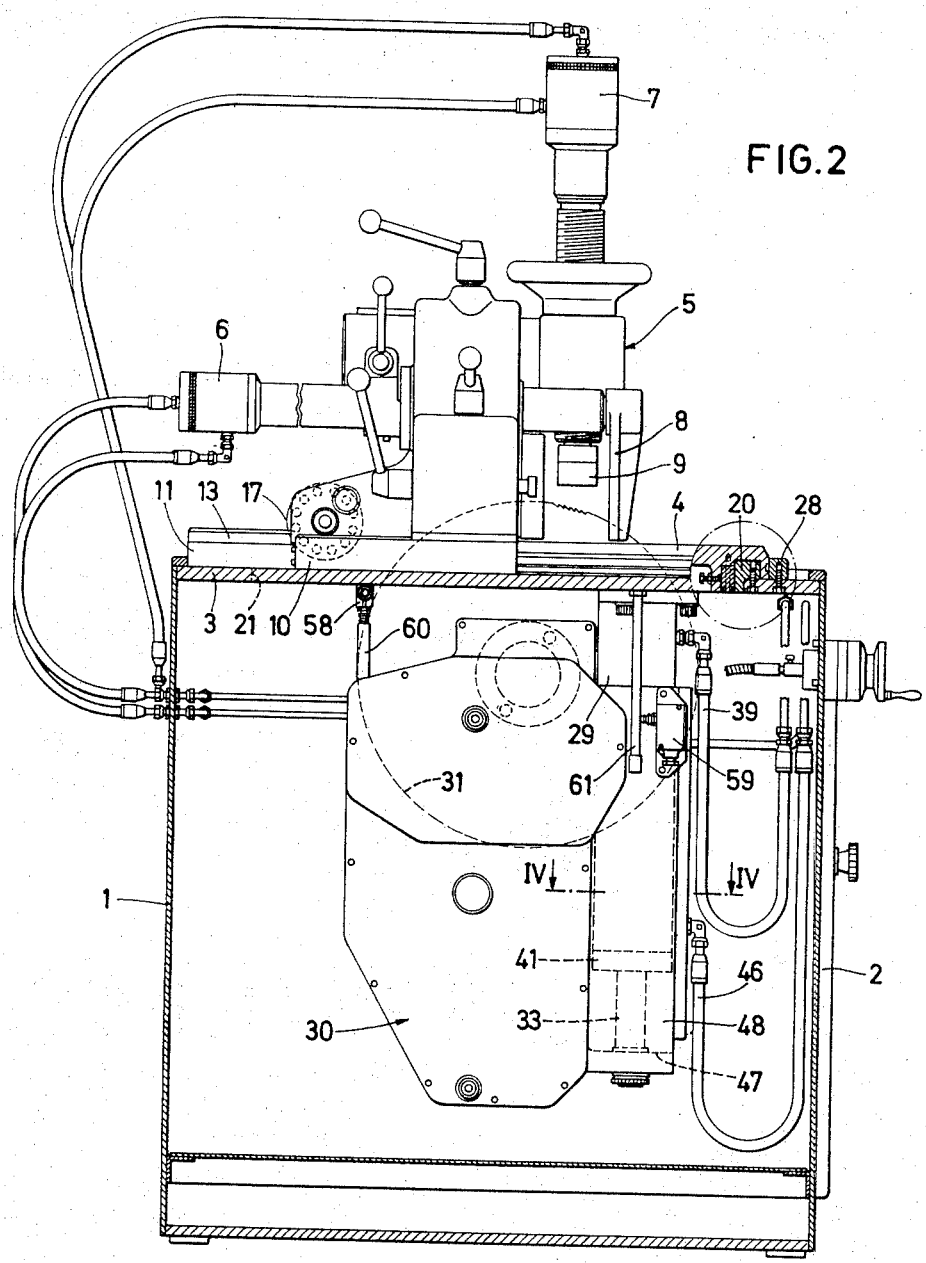

FIGS. 1 and 2 show the cold circular saw of this invention viewed from the front and the side, respectively. This cold circular saw comprises a housing 1 provided with doors 2, a rotary table 4 pivoted on the cover plate 3 of the housing, and a yoke 5 spanning this rotary table. On this yoke are disposed clamping tools 8 and 9, which can be actuated via hydraulic cylinders 6 and 7, for holding a bar-shaped work-piece, not shown, while it is being processed or worked. The yoke 5 is displaceable with respect to rotary table 4 and parallel to the plane thereof along a flat guide 10 and along a side-wall guide 11 which are disposed on cover plate 3. Flat guide 10 has two matching plane surfaces. The part of side-wall guide 11 which is fixed to cover plate 3 has a rib 12, running along it longitudinally and protruding upward, with a toothed rack 13, which rib and toothed rack protrude into a groove 14 in the counterpart. By means of a pinion 15 supported in yoke 5, th yoke can be moved back and forth along the said guides.

Figure 6:
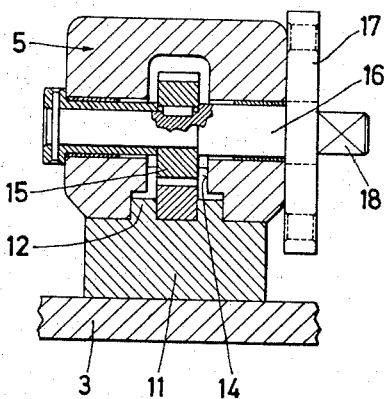

A cross-section through side-wall guide 11 with pinion 15 is shown in FIG. 6. On one side of the shaft 16 carrying pinion 15, a slotted disc 17 is set, the end of shaft 16 being shaped into a four-cornered or square shaft 18 and projecting beyond this slotted disc. A crank, not shown, can be set on this four-cornered shaft 18 for adjusting yoke 5 with respect to rotary table 4.

Figure 5:
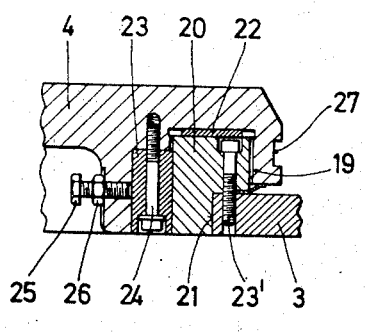

Rotary table 4 has a groove 19, open downward, for partially enveloping an upwardly projecting ring 20 fastened to cover plate 3. This ring simultaneously forms the rim of a round recess 21 in cover plate 3, into which recess rotary table 4 partially juts. A portion of the periphery of rotary table 4 is shown in FIG. 5. Between the bottom of the groove 19 and the contact surface of ring 20, there is a slip layer 22 made of synthetic material for reducing the friction and the maintenance work. Ring 20 is fastened to cover plate 3 by means of screws 23'.

Between the inner side of ring 20 and the inner side face of groove 19 are disposed three friction segments 23, uniformly distributed over the circumference and preferably also made of synthetic material. These friction segments 23 are fastened to rotary table 4 by screws 24. By means of setscrews 25 with a check nut 26, at least one of these friction segments 23 can be pressed against ring 20, whereby the diametrical clearance of rotary table 4 is eliminated.

Rotary table 4 has a second groove 27 running along its circumference, in which engage ribs of twelve guide elements 28 which are uniformly distributed at the circumference of the rotary table and fastened to cover plate 3. These guide elements prevent the axial displacement of rotary table 4. These guide elements, too, are preferably made of synthetic material.

Figure 3:
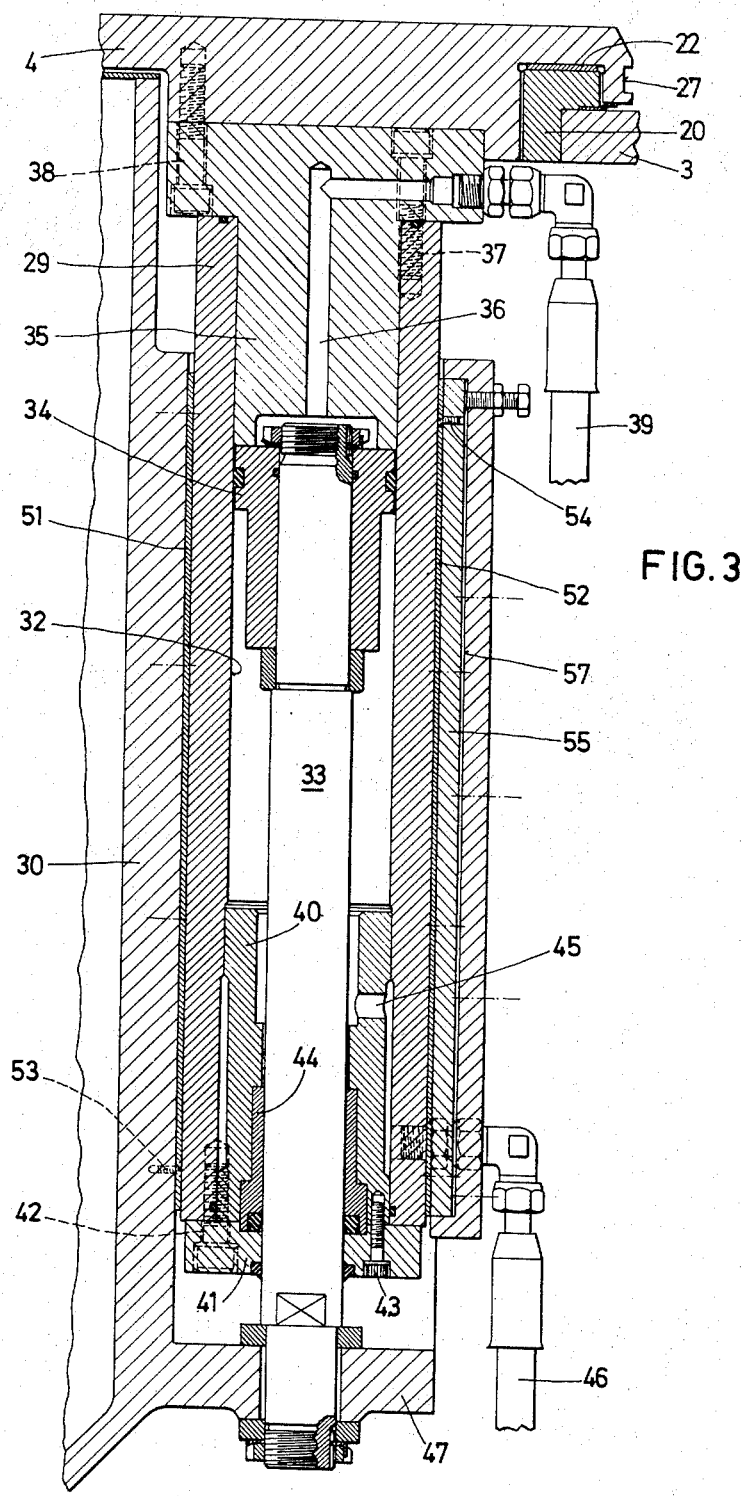

On the underside of rotary table 4, a downwardly projecting square column 29 is rigidly fastened. On this square column, a drive assembly 30 is disposed so as to be displaceable endwise. This drive assemlby comprises a motor, not visible, and a transmission, not shown, for driving a circular sawblade 31. The entire drive assembly 30, together with the circular sawblade, is displaceable perpendicular to the plane of rotary table 4, circular sawblade 31 being movable partially through a slit in the rotary table and through the workpiece, not shown, for sawing the workpiece. The feed drive for carrying out this movement of circular sawblade 31 is disposed in a space-saving manner within square column 29. In FIG. 3, the construction of square column 29 is shown. It has a longitudinal bore 32 in which a piston 34, fastened to a piston-rod 33, is disposed. The side of longitudinal bore 32 associated with rotary table 4 is closed off by a cover 35. The latter is fastened on the one hand to the square column 29, by screws 37, and on the other hand to rotary table 4, by screws 38. In order not to clutter the drawing, only one of each of these screws is shown. An angled duct 36 is provided in bore cover 35 for supplying and withdrawing a pressure fluid. One end of this duct 36 opens into the interior of longitudinal bore 32, while th other end of this duct 36 is connected to a pressure line 39.

The side of longitudinal bore 32 away from rotary table 4 is closed off by a tubular closure-piece 40 which is fastened to the lower face of square column 29 by means of an end ring 41 and screws 42 and 43. A bushing 44 made of synthetic material is inserted in this closure-piece 40 to reduce the friction between piston-rod 33 and closure-piece 40. Coming from another pressure line 46, a second duct 45 opens into the interior of longitudinal bore 32, this duct passing through a space between closure-piece 40 and the broadened longitudinal bore 32, an opening in closure-piece 40, and a space between closure-piece 40 and piston-rod 33.

Piston-rod 33 is connected to a flange 47 disposed on drive assembly 30, whereby the movement of piston 34 is transmitted to drive assembly 30.

Figure 4:
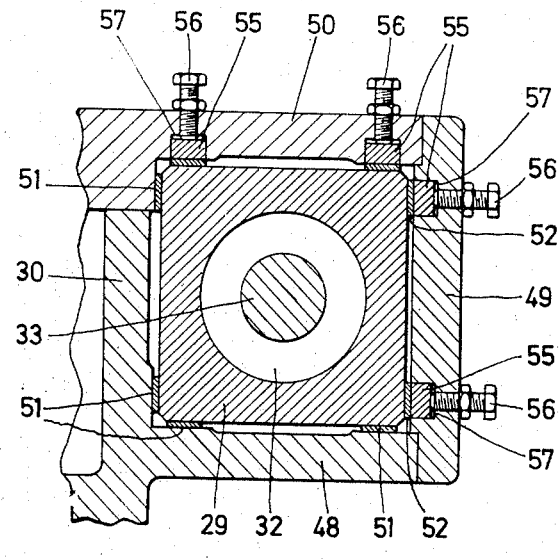

As can be seen from FIG. 4, square column 29 is enclosed by a portion of drive assembly 30, a side wall 48 rigidly connected to the latter, and two detachable other components or parts 49 and 50, so that drive assembly 30 is displaceable along square column 29 but is not rotatable around it.

Between the side faces of square column 29 and the parts opposite these side faces, lamellar inserts 51 and 52 made of synthetic material are provided. Inserts 51 are fastened by means of countersunk screws 53, only one of which is shown in FIG. 3, to the inside of the portion of drive assembly 30 facing square column 29 and to side wall 48. Inserts 52 are fastened by countersunk screws 54, of which there is also only one shown in FIG. 3, to supporting rails 55. The latter are disposed in grooves 57 in parts or components 49 and 50 and can be pressed against the square column by means of setscrews 56 for regulating the clearnace between square column 29 and drive assembly 30.

When, for instance, a pressure fluid is fed via pressure line 39 and duct 36 into the interior of longitudinal bore 32, i.e., to the space above piston 34, then piston 34 moves downward with respect to square column 29, this movement being transmitted to drive assembly 30 by piston-rod 33 and flange 47. In this way, circular sawblade 31 is lowered. If a pressure fluid is fed to the space beneath piston 34 via pressure ine 46 and duct 45, then a movement in the opposite direction is thereby imparted to drive assembly 30, so that circular sawblade 31 is raised, thus sawing the workpiece, not shown.

To limit the up-and-down movement of drive assembly 30, limit switches 58 and 59 are provided, which cooperate respectively with an acuating rod 60 fastened to drive assembly 30 and with an actuating rod 61 fastened to rotary table 4.

Square column 29 can be disposed near the center of circular sawblade 31, the direction of the feeding power acting upon drive assembly 30 as near as possible to that center, whereby the stability is increased. Because piston 34 is disposed inside square column 29, this guide and this feed drive take up little room.

The construction of the cold circular saw described above is simple, and this cold circuiar saw can therefore be manufactured efficiently. Thanks to the synthetic material parts used at the sliding locations, any additional lubrication of the guideways is superfluous, so that maintenance of the cold circular saw described above is reduced to a minimum.

While there is shown and described present preferred embodiments of the invention, it is to be distinctly understood that the invention is not limited thereto but may be otherwise variously embodied and practiced within the scope of the following claims.

I claim:

1. A cold circular saw, comprising a rotary table, a circular saw blade cooperating with said rotary table, guide means, a drive assembly for driving the circular saw blade, said drive assembly being connected with the rotary table by means of said guide means and displaceable relative to said rotary table, a pair of longitudinal guides, a yoke for holding the workpiece to be processed, said yoke at least partially spanning the rotary table and displaceable along said two longitudinal guides, said guide means for the drive assembly embodying a single square column and components around the square colum, a piston provided with a piston rod for moving the drive assembly arranged within the square column, said square column having a bore providing a working compartment for the piston, said square column being rigidly connected with one of said rotary table or drive assembly and said piston being rigidly connected with the other of said drive assembly or rotary table.

2. The cold circuiar saw as defined in claim 1, further including means for rigidly connecting said square column with the rotary table and means for rigidly connecting said piston with the drive assembly.

3. The cold circular saw as defined in claim 1, wherein said square column is rigidly connected with the drive assembly and said piston is rigidly connected with the rotary table.

4. The cold circular saw as defined in claim 1, further including plastic inserts provided between the components surrounding the square column and the guide means for guiding the drive assembly, and wherein at least two of these inserts bear at side surfaces of the square column disposed at right angles to one another, and adjusting screw means for said two inserts for displacing said two inserts transverse to the square column to adjust for a guiding action which is free of play.

5. The cold circular saw as defined in claim 4, further including a cover plate adjacent said rotary table, a ring fastened to said cover plate, said rotary table having a circular groove partially enclosing said ring which is fastened to said cover plate and projecting beyond said cover plate, at least three friction segments formed of synthetic material arranged between the inner side of the ring and the inner side face of the groove, screw means for radially adjusting at least one of said segments for eliminating the radial clearance, said rotary table being provided with a further groove extending along its circumference, guide means substantially uniformly disposed at the circumference of the rotary table and engaging with said further groove for preventing axial displacement of the rotary table.

6. The cold circular saw as defined in claim 4, wherein one of said longitudinal guides for the yoke is a flat guide and the other longitudinal guide is a sidewall guide, said sidewall guide having a stationary portion provided with a toothed rack, a pinion supported at the yoke for displacing said yoke, said pinion engaging with said toothed rack.

* * * * *